Figure 1:
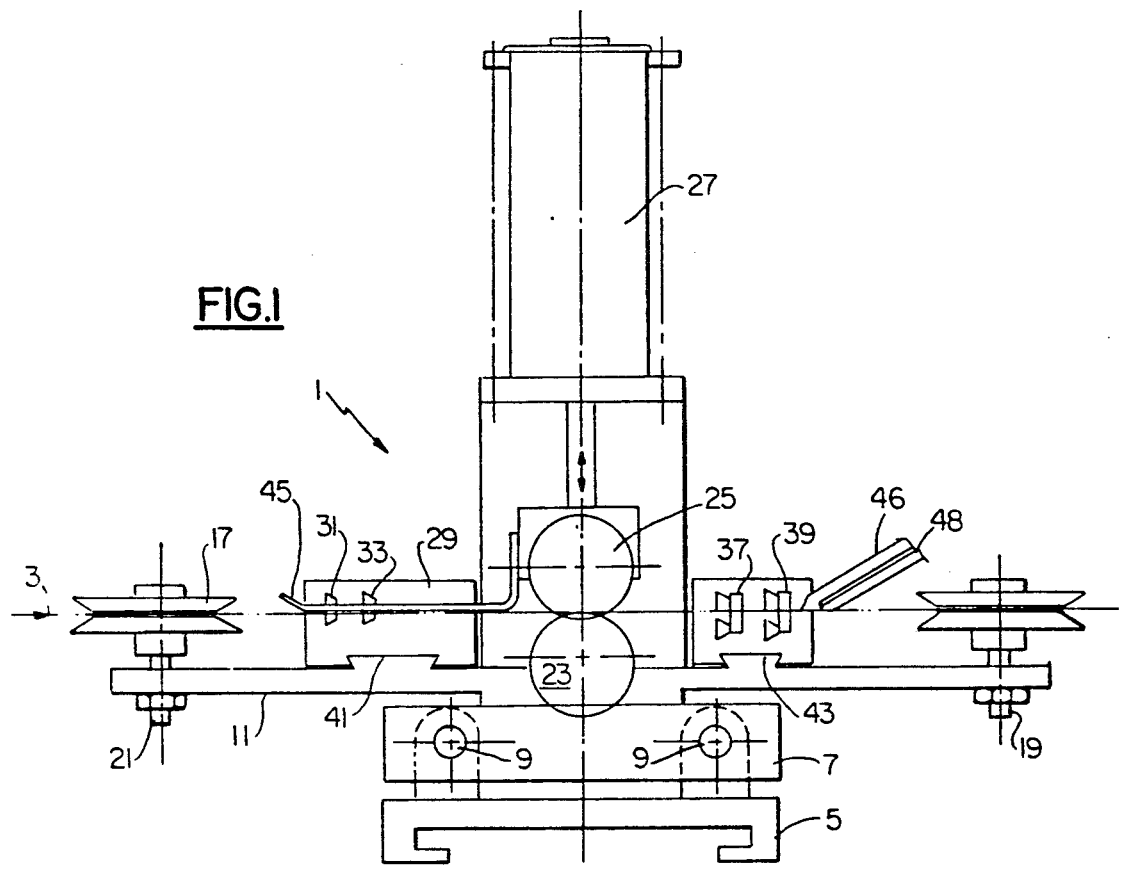

United States Patent [19]

Sandretti et al.

[11] Patent Number: 5,121,570

[45] Date of Patent: Jun. 16, 1992

[54] DEVICE FOR CONTINUOUSLY GRINDING THE EDGES OF MOVING METAL FOILS

[75] Inventors: Pino Sandretti, Flemalle; Jacques Pelerin, Tilff; Claude Minne, Ittre; Jacques Pietteur, Beaufays, all of Belgium

[73] Assignee: Cockerill Sambre, Societe Anonyme, Belgium

[21] Appl. No.: 474,820

[22] PCT Filed: Jan. 4, 1989

[86] PCT No.: PCT/BE89/00001

§ 371 Date: Sep. 6, 1990

§ 102(e) Date: Sep. 6, 1990

[87] PCT Pub. No.: WO89/06170

PCT Pub. Date: Jul. 13, 1989

[30] Foreign Application Priority Data

Jan. 6, 1988 [BE] Belgium ............................ 8800004

[51] Int. Cl.⁵ ............................................. B24B 7/00
[52] U.S. Cl. ............................................ 51/3; 51/5 B; 51/5 C; 51/80 A; 29/17.2
[58] Field of Search ............ 51/3, 5 R, 5 B, 5 C, 51/285, 323, 326, 80 R, 80 A, 80 B, 82 BS; 29/17.2, 17.8, 561, 650, DIG. 19; 409/303

[56] References Cited

U.S. PATENT DOCUMENTS

| 2,062,875 | 12/1936 | Gardner | 29/17.2 |
| 2,105,736 | 1/1938 | Hudson | 29/17.2 |
| 2,120,318 | 6/1938 | Wean | 29/17.2 |
| 2,214,618 | 9/1940 | Kenyon et al. | 29/17.2 |
| 2,242,815 | 5/1941 | Darner | 409/303 |
| 2,709,874 | 6/1955 | Delafontaine | 51/80 B |
| 4,265,055 | 5/1981 | Cartwright et al. | 51/80 B |

FOREIGN PATENT DOCUMENTS 1365153 5/1964 France.

*Primary Examiner*—M. Rachuba
*Attorney, Agent, or Firm*—Hayes, Soloway, Hennessey & Hage

[57] ABSTRACT

A device for continuously grinding the edges of moving metal foil comprises a stationary support on which a mobile support can slide perpendicular to the strip. The mobile support comprises a pivoting arm, the ends of which are provided with a roller for guiding the strip, lower and upper dressing rollers, an upstream tool holder, with at least one tool for dressing the edge and a downstream tool holder for chamfering the edge. The mobile support is brought into contact with the edge of the strip by the application of an adjustable pressure to the guide.

14 Claims, 2 Drawing Sheets

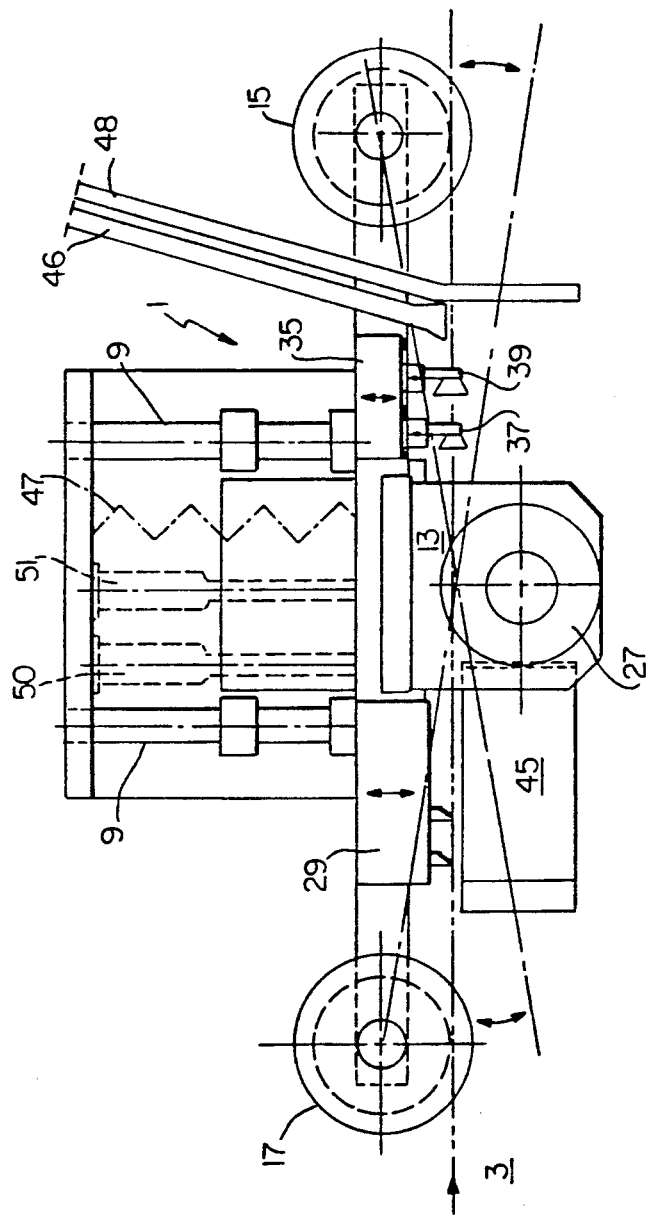

DEVICE FOR CONTINUOUSLY GRINDING THE EDGES OF MOVING METAL FOILS

SUBJECT OF THE INVENTION

The present invention relates to a device for continuously grinding the edges of moving metal foils in strip form.

DISADVANTAGES OF THE SOLUTIONS OF THE STATE OF THE ART

It is known that rolled metal foil strips have irregularities on the edges, often referred to as edge serrations, which are essentially due to the burrs produced by shearing the edges after pickling and which are exaggerated by rolling.

The irregularities become increasingly pronounced as the rolling advances and the foil thicknesses get smaller.

In addition to the irregularities in the transverse direction of the metal foil strip, the latter often has burrs in the plane perpendicular to the main plane of the strip and mainly in the strips sheared while in motion.

This results in premature wear of the coating of the rollers for driving and supporting the metal foil strip owing to a shearing force exerted in the mass of said coating, which is often, in the case of prelacquering lines, made of rubber or of polyurethane of low hardness.

This premature wear is exaggerated by the varying relative speeds between rollers and strips.

In particular in the case of coated metal foils, the thickness of the coating varies as a result over the width of said metal foil.

Consequently, a hon (sic) homogeneous product and/or a product having defects in the coating, namely extraneous streaks or excessive thicknesses on edges, is obtained.

The document FR-A-1,365,153 (W. SCHMIDT) makes known a device for polishing or profiling edges of glass panels and mirrors. In this device, provision is made for the abrasive wheels, that is to say the polishing members, to be mounted on double oscillating arms. The abrasive wheels are brought into contact with the parts to be treated by a counterweight and/or a pressure spring.

This document, which relates to a totally different technical field from that with which the present invention is concerned, does not make it possible to solve the abovementioned disadvantages.

OBJECTS AIMED AT BY THE INVENTION

The present invention aims to overcome the various disadvantages mentioned above.

A specific object of the present invention consists in providing a device which permits continuous grinding of the edges of metal foils in strip form.

Another specific object of the present invention consists in providing a device of the type mentioned above which is stable as a function of the speed of movement of the metal foil strip.

CHARACTERISTIC ELEMENTS OF THE INVENTION

According to the present invention, the device of the type mentioned above comprises a stationary support mounted on a frame adjustable in height and a mobile support arranged so as to be able to slide on said stationary support in a direction essentially perpendicular to the direction of movement of the metal foil strip. The mobile support comprises an arm pivoting at its center on an essentially vertical axis and comprising at each of the two ends a guiding roller which bears on one and the same edge of a metal foil strip, a lower dressing roller and an upper dressing roller between which the metal foil strip is gripped and dressed with an adjustable pressure, an upstream tool holder which carries at least one cutting tool for dressing the sheared edge of the metal foil strip and a downstream tool holder which carries at least one tool for chamfering the upper and lower edges, the mobile support being brought into contact with the edge of the metal foil strip, via the guiding rollers, with an adjustable pressure which bears on the stationary support.

Tests have shown that the guiding of the tools on the edges with the aid of guiding rollers mounted on the two ends of an arm pivotable at its center is particularly advantageous and suitable for ensuring a permanent contact between the tools and the edges.

Advantageously, the pivotable arm is dimensioned such that the guiding rollers are located respectively upstream and downstream of the corresponding tool holders, so that one guiding roller bears on a rough edge and the other guiding roller bears on a ground edge. In this way, appropriate stabilization is obtained as a function of the speed of movement of the strip.

Preferably, the adjustable pressure which brings the mobile support via the guiding rollers into contact with the edge comprises an active component and a passive component. According to a particularly preferred embodiment of the present invention, the active component consists of an adjustable pressure jack and the passive component consists of a spring. It has been found that a combination of these two means produces advantageous results, in particular as regards sensitivity to vibrations, more especially at high speed.

Figure 2:
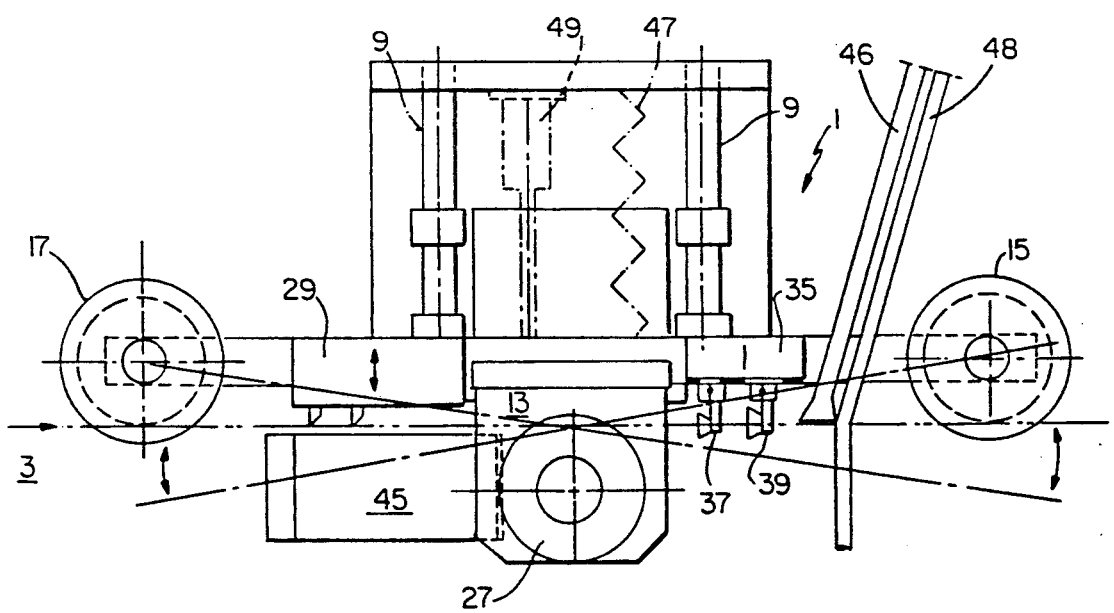

Other details will become more clearly apparent on reading the description which follows, given in support of the accompanying drawings, in which:

FIG. 1 shows a diagrammatic front view of the device according to the present invention, FIG. 2 is a diagrammatic plan view of the device shown in FIG. 1, and FIG. 3 is a diagrammatic plan view of another embodiment of the device shown in FIGS. 1 and 2.

With reference to the figures, identical numerals indicate identical or analogous elements.

The device 1 according to the present invention intended to grind the edges of metal foil strips 3 comprises a stationary support 5 mounted on a frame adjustable in height (not shown), and a mobile support 7 which can slide on guides 9 integral with the stationary support 5.

The mobile support 7 comprises an arm 11 mounted so as to be able to pivot on an essentially vertical axis 13 at its center and provided, at both of its ends, with a guiding roller 15 and 17. Said guiding rollers are advantageously adjustable in height with the aid of a threaded rod, 19 and 21 respectively.

Said pivoting arm 11 additionally comprises a lower roller 23 for dressing the metal foil, the axis of rotation of which is fixed, and an upper dressing roller 25. Advantageously, said upper dressing roller can be separated from said lower dressing roller with the aid of a jack 27. This facilitates the passage of a seam or folded seam connection of two metal foil strips in the continuous treatment process.

According to the invention, the upper dressing roller 25 presses, with a preferably adjustable pressure, the metal foil 3 moving past at high speed against the lower dressing roller 23 in order to dress said foil at the place where the machining is to be performed on the edges. Said pressure is likewise exerted with the aid of the jack 27.

It has been found that the best results are obtained by machining the sheared edges of metal foils 3 moving past at high speed with cutting tools and by proceeding in several stages. An upstream tool holder 29 is provided with two cutting tools 31 and 33, a roughing tool 31 and a finishing tool 33, in order to dress the sheared edge of the metal foil 3. A downstream tool holder 35 is provided with two chamfering tools, a roughing tool 37 and a finishing tool 39.

Advantageously, the tool holders 29 and 35 are mounted on guides 41, 43 so that they can be displaced perpendicularly to the axis of movement of the strip 3, on the pivoting arm 11.

It is understood of course, that depending on the metal material to be treated and on the other conditions of use, it may prove advantageous to use more than two dressing tools and/or more than two chamfering tools in succession.

Any type of tool known per se for this kind of operation is suitable in the application under consideration. It has been found that, in order to reduce the costs of maintaining and shutting down the machine, it is advantageous to use dressing tools with four cutting edges which make it possible to replace one cutter with another simply by rotating the tool.

According to a preferred embodiment, the supporting end of the upper dressing roller 25 is equipped with an entrance shoe 45 which facilitates the guiding of the passing metal foil.

Preferably, the device according to the present invention is equipped with a chip-removal means such as air-blowing pipes 46. It is also possible to provide means 48 for projecting lubricants or coolants.

According to a particularly preferred embodiment of the present invention, the mobile support is brought into contact with the edge of the metal foil strip, via the guiding rollers 15 and 17, with the aid of a pressure comprising an active component and a passive component. Said pressure (lacuna) exerted by a spring 47 and by at least one jack 49. Preferably, the active component is exerted by a following jack 50 and a withdrawing jack 51.

The present specification is limited to the description of a device for grinding the edges but it is obvious that a device of the type mentioned above can be arranged on either side of the metal foil strip so as to grind both edges of said strip simultaneously and continuously whatever the transverse displacement of this strip.

It is obvious that the present invention is not limited to the device as described but extends to the scope defined by the claims.

We claim:

1. Device for continuously grinding the edges of moving metal foils in strip form, and comprising a stationary support mounted on a frame adjustable in height and a mobile support arranged so as to be able to slide on said stationary support in a direction essentially perpendicular to the direction of movement of the metal foil strip, wherein said mobile support comprises an arm pivoting at its center on an essentially vertical axis and comprising at each of the two ends a guiding roller which bears on one and the same edge of a metal foil strip, a lower dressing roller and an upper dressing roller between which the metal foil is gripped and dressed with an adjustable pressure, an upstream tool holder which carries at least one cutting tool for dressing the sheared edge of the metal foil strip and a downstream tool holder which carries at least one tool for chamfering the upper and lower edges, the mobile support being brought into contact with the edge of the metal foil strip via the guiding rollers, with an adjustable pressure which bears on the stationary support.

2. Device according to claim 1, wherein the guiding rollers are located respectively upstream and downstream of the corresponding tool holders so that one guiding roller bears on a rough edge and the other guiding roller bears on a ground edge.

3. Device according to claim 1, wherein the adjustable pressure which brings the mobile support via the guiding rollers into contact with the edge comprises an active component and a passive component.

4. Device according to claim 1, wherein the active component comprises a jack and the passive component comprises a spring.

5. Device according to claim 1, wherein the guiding rollers are adjustable in height.

6. Device according to claim 1, wherein the upper dressing roller is arranged so that it can be separated from the lower dressing roller.

7. Device according to claim 1, wherein the upstream tool holder is provided with two cutting tools, a roughing tool and a finishing tool.

8. Device according to claim 1, wherein the downstream tool holder is provided with two chamfering tools, a roughing tool and a finishing tool.

9. Device according to claim 1, wherein the tool holders are mounted on guides which permit a displacement perpendicular to the axis of movement of the strip on said pivoting arm.

10. Device according to claim 1, wherein the supporting end of the upper dressing roller is equipped with an entrance shoe.

11. Device according to claim 1, and further comprises a chip-removal means.

12. Device according to claim 11, wherein said chip-removal means comprises an air blower.

13. Device according to claim 1, and further comprising a lubricant-projecting means.

14. Device according to claim 1, wherein the active component comprises a following jack and a withdrawing jack, and the passive component comprises a spring.

* * * * *